United States Patent
Taneaki et al.

(10) Patent No.: US 6,893,616 B2
(45) Date of Patent: May 17, 2005

(54) APPARATUS FOR CONVERTING BOTH HALOGENS IN ORGANIC HALIDES AND ORGANIC COMPOUNDS TO INORGANIC SUBSTANCES

(75) Inventors: Yahata Taneaki, Nagano (JP); Tsuchiya Yuji, Nagano (JP); Toba Masahiko, Nagano (JP)

(73) Assignees: Morikawa Industries Corp., Nagano-Ken (JP); Japan Science and Technology Corporation, Saitama-ken (JP)

( * ) Notice: Subject to any disclaimer, the term of this patent is extended or adjusted under 35 U.S.C. 154(b) by 376 days.

(21) Appl. No.: 09/876,953

(22) Filed: Jun. 8, 2001

(65) Prior Publication Data

US 2002/0013507 A1 Jan. 31, 2002

(30) Foreign Application Priority Data

Jun. 8, 2000 (JP) ........................................ 2000-171753

(51) Int. Cl.[7] .............................................. B01D 50/00
(52) U.S. Cl. ......................... 422/177; 422/171; 422/172
(58) Field of Search .................................. 422/168, 171, 422/172, 173, 177

(56) References Cited

U.S. PATENT DOCUMENTS 5,417,934 A * 5/1995 Smith et al. ................. 422/177

FOREIGN PATENT DOCUMENTS

JP 6-296710 10/1994

* cited by examiner

*Primary Examiner*—Stanley S. Silverman
*Assistant Examiner*—Edward M. Johnson
(74) *Attorney, Agent, or Firm*—Banner & Witcoff, Ltd.

(57) ABSTRACT

A bed of calcium oxide and/or barium oxide in particulate form is continuously moved through a contact reaction zone such that it enters into countercurrent reaction with the feedstock and the reaction is performed in a reaction column equipped with an agitating/moving device by which the halide which is the product of reaction between the organic halide and the oxide is continuously discharged to the outside of the reaction zone.

1 Claim, 1 Drawing Sheet

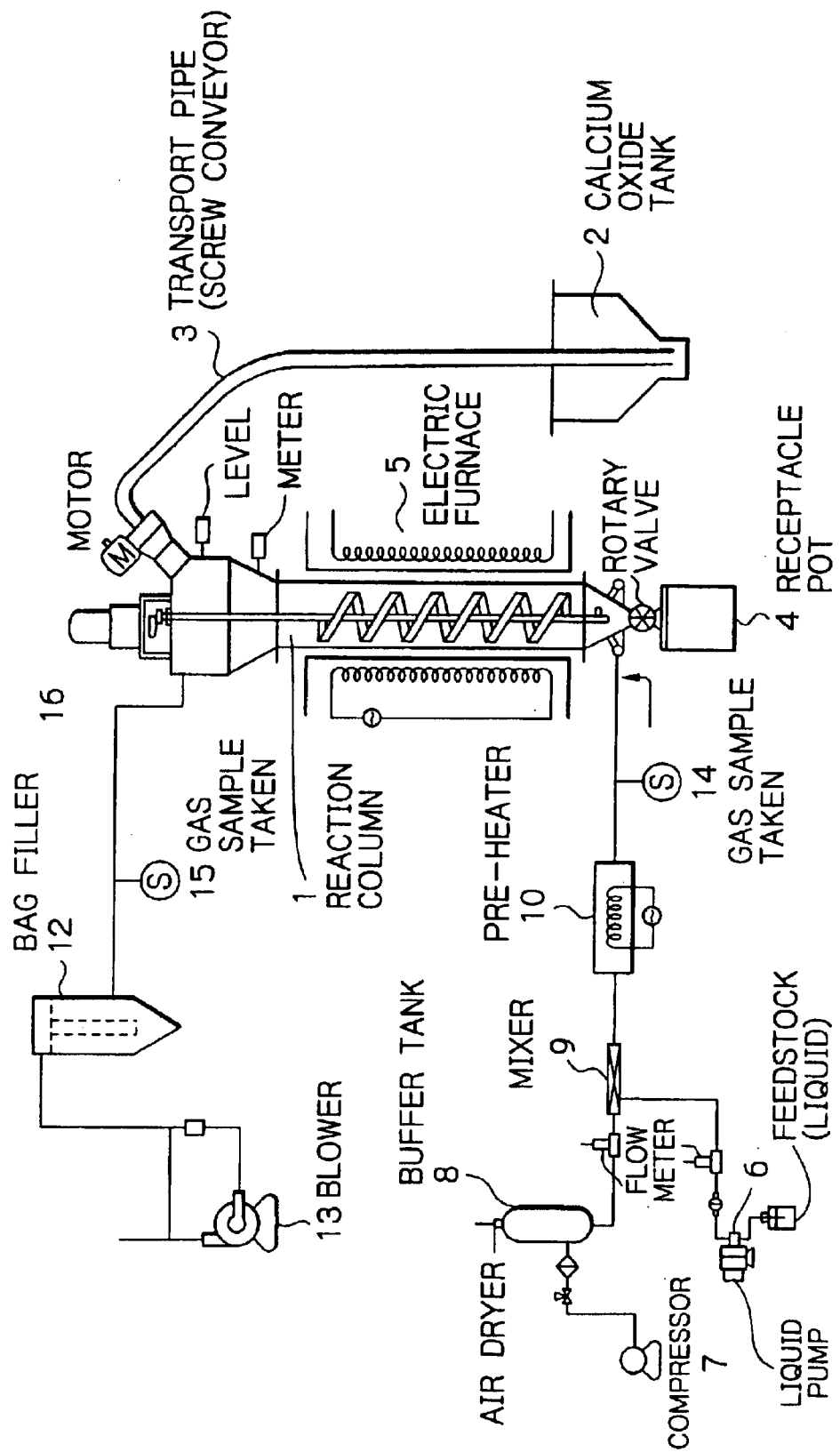

APPARATUS FOR CONVERTING BOTH HALOGENS IN ORGANIC HALIDES AND ORGANIC COMPOUNDS TO INORGANIC SUBSTANCES

BACKGROUND OF THE INVENTION

This invention relates to a method by which products containing organic halides are converted to nontoxic inorganic compounds without evolving highly toxic dioxins, as well as an apparatus for implementing the method.

Volatile organic halides have the potential to deplete the ozone layer whereas nonvolatile organic halides can contaminate the environment such as soil and groundwater. If organic halides are disposed of by incineration, highly toxic dioxins may be evolved from the incinerator. The emission of dioxins has posed a big social problem since they seriously impair the human health by accumulating in the human body and presumably affecting nursing infants via their mother's milk.

The use of PCBs, another highly toxic substance, has been banned but most of them are stockpiled in the absence of an effective and safe way of disposal. The production of volatile organic fluorides have suspended since they cause ozone depletion but even today they are used in large quantities. In spite of these difficulties, halogenated organic compounds have useful characteristics; for example, chlorofluorocarbon are used as coolants, fire retardants and detergents whereas chlorinated compounds such as trichloroethylene, methylene chloride and tetrachloroethylene are used as detergents; most pharmaceuticals, agrichemicals and insecticides contain chlorine.

It is therefore necessary that these substances be used in a controlled fashion and, after use or if their substitutes become available, be converted to a harmless state. In fact, no effective methods or apparatus that meet this need have been developed.

Under the circumstances, it has been proposed to decompose PCBs and dioxins either biologically by using microorganisms or chemically by using supercritical water reactions. Speaking of the apparatus for treating organic halides or their potential generators by incineration, studies and proposals have been made to retrofit the existing incinerators such that they will evolve no dioxins. However, the proposals so far made are comparatively difficult to operate, require expensive apparatus or have the problem of complexity.

Japanese Patent Public Disclosure No. 187645/1997 proposes an improved method for treating harmful organic chlorinated compounds such as virgin PCBs in prolonged storage or spent trichloroethylene and trichloroethane that are stored untreated. In the method, the harmful chlorinated compound is reacted with calcium oxide, barium oxide or a mixed oxide thereof in air or an inert gas at 400–650° C., whereby the chlorine in the organic chlorinated compound (which is the most difficult to treat) is altered to calcium chloride or barium chloride. This method of rendering organic chlorinated compounds harmless by dechlorination reaction remains only theoretical and is far from being out of the glass reactor to be used commercially. For example, transformers with ratings of 50 kV·A use a mixture of PCB and a mineral oil as the insulating oil and the residual gas from the dechlorination treatment by the method contains organic matter but this cannot be treated continuously.

Japanese Patent Application No. 46800/1999 teaches an improved method and apparatus by which products containing organic halides either alone or in admixture with organic compounds are converted to inorganic substances. The products are gasified or atomized and subjected to catalytic reaction with calcium oxide, barium oxide or a mixture thereof that are heated at 400–700° C., whereby the halogen in the organic halide is converted to a calcium halide and/or a barium halide. A moving bed of calcium oxide and/or barium oxide in particulate form is continuously brought into countercurrent contact reaction with the product (feedstock: organic liquid containing organic halides used solvent) and the halogen in the resulting organic halide reacts with the oxide to form a halide which is continuously discharged from the contact reaction zone whereas the residual gas from the contact reaction is contacted with a platinum or palladium catalyst on a ceramic support at 200–500° C. and the residual non-halogenated organic compound is incinerated. In this method, if the particles of calcium oxide and/or barium oxide were moved continuously in a more efficient way to have contact reaction with the feedstock, the need to provide the means for catalytic treatment of the effluent gas could be eliminated and the overall system configuration would become more simplified.

SUMMARY OF THE INVENTION

An object, therefore, of the invention is to provide a practically feasible method by which a feedstock containing organic halides either alone or in admixture with organic compounds can be converted to nontoxic inorganic compounds without evolving highly toxic dioxins and which permits the residual gas to be discharged direct into the atmosphere without further treatments.

Another object of the invention is to provide an apparatus for implementing the method.

In the course of their studies made to work out a solution to the problem described above, the present inventors found that in the prior art documented methods of treatment using calcium oxide, barium oxide or a mixed oxide thereof, sulfur compounds in the feedstock could also be removed by treatment with those oxides in parallel with the process of dechlorination.

Today, many organic halides are prohibited from production and use because once produced, they are very difficult to dispose of. The present invention aims at treating such organic halides into a stable form.

The conventional treatment of organic halides consists of their thermal, catalytic or otherwise decomposition and neutralizing the evolved hydrochloric acid gas. In the present invention, the organic halides are subjected to direct dechlorination with calcium oxide and this not only prevents the corrosion of the apparatus by the by-product hydrochloric acid gas but also simplifies the overall process.

In the present invention, even if the organic halide to be treated contains organic compounds and other impurities, they are decomposed into carbon dioxide gas and water vapor as the feedstock is passed through a reactor column of calcium oxide heated at 400–700° C.; hence, the organic halides can be converted to the harmless inorganic form without using a catalytic burner to purify the effluent gas.

In a particular case where the organic halide is decomposed with calcium oxide, a calcium halide forms as the reaction product. All calcium halides except calcium fluoride have low melting points. If calcium oxide reacts with an organic chlorinated compound, calcium chloride results. Since calcium chloride has low melting point, it fuses to the unreacted calcium oxide and the agglomerates will grow into a solidified mass which is difficult to discharge from the reaction column. If no agitating/moving device is provided within the reaction column, the reaction product forms a solidified mass which is practically impossible to be discharged into a receptacle pot through the rotary valve at the bottom of the column.

In the present invention, an agitating/moving device is provided within the reaction column and the solidified mass is ground by the rotating screw ribbon into smaller pieces that can be easily discharged into the receptacle pot. For commercial application of the present invention, a continuous reaction must be performed consistently and the agitating/moving device mounted in the reaction column not only prevents the growth of the solidified mass but also allows for easy discharge of calcium chloride, thereby enabling consistent and continuous treatment of organic halides. The present inventors found this fact when they were making experiments in connection with Japanese Patent Application No. 46800/1999 and the reaction column equipped with the agitating/moving device allowed for effective and continuous treatment of the feedstock.

In the present invention, a mixture of air and the feedstock is passed countercurrently through the reaction column packed with calcium oxide heated at ca. 400–700° C. and the feedstock is decomposed into $CO_2$ and $H_2O$; it is therefore unnecessary to use a catalytic burner of the type described in Japanese Patent Application No. 46800/1999.

BRIEF DESCRIPTION OF THE DRAWING

The FIGURE is the general view of a specific apparatus for implementing the method of the invention.

DETAILED DESCRIPTION OF THE INVENTION

The invention is described below in detail with reference to the FIGURE which is the general view of a specific apparatus for implementing the method of the invention.

A feedstock containing organic halides is supplied from a feedstock supply pump 6 into a mixer 9 after being gasified (if it has low boiling point) or atomized (if it has high boiling point). Pressurized air from a compressor 7 is passed through a buffer tank 8 so that it is mixed with constant-pressure air to have its pressure adjusted to 0.1–0.5 MPa. In the mixer, the feedstock is mixed in a specified concentration with the carrier air and the resulting mixture is supplied into a reaction column 1 via an optional pre-heater 10. The concentration of the feedstock in the mixture has to be adjusted depending on its chemical composition and physical properties such as boiling point. Generally, the reaction process can be operated in concentrations of 4–10 vol % of the feedstock.

The reaction column 1 has at the bottom an opening through which the reaction product (calcium chloride, barium chloride or a mixture thereof) is discharged and an inverted cone equipped with a device for discharging these reaction products in isolation from the outside (in the FIGURE, the device discharges particles by means of a rotary valve which is motor-driven to rotate) and supply sections for the mixture of the feedstock and air (two such supply sections are used in the FIGURE). The reaction tower has at the top a device for supplying the particles of calcium oxide, barium oxide or a mixture thereof (which may be of the same design as the particle discharging device provided at the bottom) and a device for discharging the effluent gas from the reaction column 1 into the atmosphere via a bag filter 12 by means of a blower. The particles of the oxide form a bed which moves down through the reaction column 1 as it makes countercurrent contract with the ascending feedstock and undergoes continuous reaction. Thus, the reaction column 1 functions as a moving-bed reactor. The reaction column 1 is equipped with a suitable heating device for controlling temperature, such as a vapor heater or a heater of the type used in electric furnaces.

The particles of calcium oxide and/or barium oxide are continuously supplied from a hopper 2 through a transport pipe 3 to a controlled particle feeder such as a metering feeder at the top of the reaction column 1 as they are carried by a screw conveyor extending through the pipe 3. The particles of the oxide have an optimum size that depends on the chemical composition of the feedstock and its physical properties such as boiling point. They have preferably an average size of 0.4–4.5 mm. Smaller particles may of course be used.

A screw is provided in the transport pipe and rotated to feed calcium oxide to the top of the reaction column. On this occasion, part of the calcium oxide in particulate form is ground with the screw as it passes through the transport pipe and the resulting fine powder of calcium oxide is accompanied by air and accumulates on the inner surface of the piping; it hence must be trapped with the bag filter 12.

For treatment in the reaction column, the feedstock is forced into the column by means of compressed air from the compressor 7 and a sufficient negative pressure is created within the column by aspiration with the blower 13 to prevent leakage of harmful products.

EXAMPLE 1

The organic chlorinated compound to be treated in this example was trichloroethylene. The reaction column 1 was supplied with calcium oxide from the calcium oxide tank 2 by means of a screw conveyor. The calcium oxide was composed of particles having an average size of 0.4–4.5 mm. The electric furnace 5 was heated to 650° C. and when the temperature in the reaction column reached a specified temperature, the trichloroethylene was charged into the column from the feedstock supply pump 6. Air as pressurized with the compressor 7 was forced into the buffer tank 8 so that its pressure was adjusted to 0.1 MPa. The air was then sent to the mixer 9, where it was mixed with the trichloroethylene at a concentration of 6%. The mixture was heated in the pre-heater 10 before it was introduced into the reaction column 1.

The supplied calcium oxide formed a bed which moved down through the reaction column 1 countercurrently with the trichloroethylene so that the reaction would occur. As a result, the chlorine in the trichloroethylene was converted to calcium chloride, which was forced into the receptacle pot 4 by means of the rotary valve provided at the bottom of the reaction column 1. The trichloroethylene as the feedstock to be dechlorinated was completely decomposed into water and carbon dioxide gas within the reaction column. The carbon dioxide gas was discharged into the atmosphere via the bag filter 12 at a pressure controlled by the blower 13.

EXAMPLE 2

As in Example 1, calcium oxide in the hopper 2 was charged into the reaction column through the transport pipe 3 and the reaction column was heated with the electric furnace 5. The electric furnace 5 consisted of three sections, top, middle and bottom, which were capable of independent control over the temperature of heating the moving bed of calcium oxide descending through the reaction column. Trichloroethylene (TCE) was fed from the feedstock supply pump 6 into the mixer 9 which was also supplied with compressed air from the compressor 7. The TCE in the resulting mixture was evaporated in the pre-heater 10 and introduced into the reaction column from the bottom.

The air and TCE were flowed into the mixer at respective rates of 200 L/min and 15.1 mL/min. Calcium oxide was fed into the reaction column from the top and discharged from the bottom at a rate of 0.35 kg/5 min (taken with calcium chloride, the total effluent was 8.37 kg/120 min). The reaction column was heated with the electric furnace to effect dechlorination reaction. The percent decomposition of TCE was measured for a continuous period of 120 minutes. The results are shown in Table 1.

TABLE 1

Decomposition of Trichloroethylene with Calcium Oxide
Air flow rate: 200 L/min
TCE supply: 15.142 mL/min (total of 1817 mL/120 min)
Quicklime effluent: 0.35 kg/5 min (total of 8.37 kg/120 min)
Agitating speed: 9.2 rpm

| Time after the start of reaction, min | Temperature within the moving bed, °C. | | | TCE concentration, ppm | | Percent decomposition of TCE | TCE concentration, ppm |
|---|---|---|---|---|---|---|---|
| | Top | Middle | Bottom | Before decomposition | After decomposition | | |
| 0 | 647 | 660 | 582 | $1.832 \times 10^4$ | | | |
| 10 | 650 | 687 | 677 | | 0.260(GC) | 99.999 | N.D.(GC) |
| 20 | 664 | 701 | 707 | | | | |
| 30 | 642 | 703 | 715 | | 0.971(GC) | 99.995 | N.D.(GC) |
| | | | | | N.D.(GC/MS) | 100.000 | N.D.(GC/MS) |
| 40 | 649 | 705 | 721 | | 1.977(GC) | 99.989 | N.D.(GC) |
| 50 | 659 | 709 | 726 | | | | |
| 60 | 661 | 711 | 728 | | 2.218(GC) | 99.988 | N.D.(GC) |
| 70 | 661 | 713 | 730 | | 2.771(GC/MS) | 99.985 | 0.741(GC/MS) |
| 80 | 663 | 715 | 733 | | 1.913(GC) | 99.990 | 1.956(GC) |
| 90 | 661 | 716 | 735 | | 1.332(GC) | 99.993 | 2.267(GC) |
| 100 | 664 | 721 | 737 | | 1.304(GC) | 99.993 | 3.414(GC) |
| 110 | 663 | 720 | 735 | | 1.245(GC) | 99.993 | 2.320(GC) |
| 120 | 663 | 719 | 737 | | 1.684(GC) | 99.991 | 0.065(GC) |
| | | | | | 2.136(GC/MS) | 99.988 | 2.506(GC/MS) |

The top, middle and bottom of the moving bed correspond to the respective zones in the electric furnace. The temperatures for "0 minutes after the start of reaction" are initial settings. The TCE concentration before decomposition was the value measured on the sample taken at S14. To analyze the TCE concentration after decomposition, a gas sample was taken from S15 at 10-min intervals and subjected to gas chromatography (GC) and gas chromatography/mass spectrometry (GC/MS). Even the highest TCE concentration after decomposition was no more than 2.8 ppm and the concentration of perchloroethylene (PCE) as the by-product was about 3.5 ppm as measured by GC/MS. Both values were less than the environmentally tolerable level of 50 ppm.

As described above, a bed of calcium oxide, barium oxide or a mixture of these oxides is continuously moved through a reaction tower countercurrently with a feedstock containing organic halides so as to effect its dechlorination by contact reaction and the calcium and/or barium halide as the reaction product is continuously discharged from the reaction column to the outside by means of the agitating/moving device provided in the column. The feedstock can be converted to a nontoxic inorganic compound at high efficiency.

What is claimed is:

1. In an apparatus in which a feedstock containing an organic halide either alone or in a mixture with an organic compound is gasified or atomized and subjected to the reaction with calcium oxide, barium oxide or a mixture thereof that are heated at 400–700° C., whereby the halogen in the organic halide is converted to a calcium halide and/or a barium halide, the improvement comprising:

a) a means for gasifying or atomizing the feedstock containing the organic halide either alone or in admixture with the organic compound;

b) a heating means for heating the particles of calcium oxide and/or barium oxide at a controlled temperature of 400–700° C.;

c) a means for supplying the particles of calcium oxide and/or barium oxide continuously; and d) a reaction column equipped with a supply section for the feedstock as supplied from said gasifying or atomizing means and which contains the organic halide either alone or in admixture with the organic compound, a reactive section which is heated by said heating means and in which a moving bed of said oxide particles is continuously brought into countercurrent reaction with said feedstock so that the halogen in the organic halide is converted to a calcium halide and/or a barium halide, and an agitating/moving means by which said resulting calcium halide and/or barium halide is continuously discharged to the outside of the reaction system.

* * * * *